United States Patent [19]
Lenane

[11] 3,815,337
[45] June 11, 1974

[54] EXHAUST SYSTEM
[75] Inventor: Denis L. Lenane, Ferndale, Mich.
[73] Assignee: Ethyl Corporation, Richmond, Va.
[22] Filed: June 23, 1972
[21] Appl. No.: 265,699

Related U.S. Application Data
[63] Continuation-in-part of Ser. No. 879,045, Nov. 24, 1969, Pat. No. 3,688,476.

[52] U.S. Cl................. 55/276, 55/337, 55/342, 55/459, 55/518, 55/525, 55/DIG. 30, 60/299, 60/311
[51] Int. Cl............................................ B01d 50/00
[58] Field of Search ...... 55/DIG. 30, 337, 276, 342, 55/350, 459, 512, 518, 525; 60/299, 311; 181/58, 66, 67

[56] References Cited
UNITED STATES PATENTS

| | | | |
|---|---|---|---|
| 3,056,662 | 10/1962 | Ridgway | 55/DIG. 30 |
| 3,257,798 | 6/1966 | Hass | 55/DIG. 30 |
| 3,397,034 | 8/1968 | Tulleners et al. | 55/DIG. 30 |
| 3,426,513 | 2/1969 | Bauer | 55/DIG. 30 |
| 3,485,593 | 12/1969 | Lenane et al. | 60/297 |
| 3,564,843 | 2/1971 | Hirschler et al. | 55/DIG. 30 |
| 3,688,476 | 9/1972 | Lenane | 55/276 |
| 3,713,782 | 1/1973 | Watt | 23/288 F |
| 3,722,189 | 3/1973 | Tourtellotte | 55/DIG. 30 |

FOREIGN PATENTS OR APPLICATIONS
968,149   8/1964   Great Britain........................ 60/297

*Primary Examiner*—Bernard Nozick
*Attorney, Agent, or Firm*—Donald L. Johnson; Robert A. Linn; Joseph D. Odenweller

[57] ABSTRACT

Particulates are removed from a particulate-laden gas stream such as the exhaust gas from an internal combustion engine by passing the gas through a cyclone type inertial separator. The separator has particulate reject slots cut in the side wall of the cyclone chamber through which particulates are rejected into a collection chamber. The collection chamber can be filled with a porous material such as wire mesh or expanded metal. The bottom of the cyclone chamber is a nonperforate plate. The separator can be built into a muffler. Performance is improved by including an agglomeration unit between the engine and the separator. The agglomeration unit comprises a housing inserted in the exhaust gas stream between the engine and the separator which contains a pervious mass of metal bodies such as wire mesh or expanded metal lath, or alternatively contains an alumina. Performance can be still further improved by placing a filter unit downstream from the separator.

11 Claims, 10 Drawing Figures

PATENTED JUN 11 1974  3,815,337

EXHAUST SYSTEM

This application is a continuation-in-part of application Ser. No. 879,043 now U.S. Pat. No. 3,688,476 issued Sept. 5, 1972, filed Nov. 24, 1969.

BACKGROUND

The removal of dust or particulates from a gas has been practiced for many years in many diverse areas. It can be used to reduce explosion hazards in such operations as flour milling or can be used to remove particulates from smoke resulting from the burning of coal or other fuels. More recently, efforts have been made to remove particulates or finely-divided solids from the exhaust gas of internal combustion engines. These particles are formed during the combustion of the fuel and contain carbonaceous material and other combustion products of additives conventionally used in such fuels. In the past, cyclone type inertial separators have been employed in this use, as shown by U.S. Pat. Nos. 3,056,662; 3,132,473; 3,154,389; 3,162,518; 3,197,955 and 3,253,400. The devices shown in these patents all have provisions for collected solids to enter the collection chamber through a reject hole in the bottom plate or closure of the cyclone chamber. This is the area where the exhaust gas vortex reverses direction and starts spiraling up inside the outer vortex to enter the exit tube. Because of this, there is more turbulence in the area of the bottom plate of the cyclone which can cause re-entrainment of collected solids, especially under pulsating operating conditions as encountered in the exhaust system of an internal combustion engine.

SUMMARY

It has now been found that collection efficiency of a cyclone type inertial particulate separator can be greatly improved by use of a cyclone separator which is provided with particulate reject holes in the side wall of the cyclone chamber rather than in the bottom plate. In this cyclone collector the bottom closure is a non-perforate plate upon which the gas vortex reverses direction without causing re-entrainment of solids. Effectiveness is increased further by filling the collection chamber with a porous material such as wire mesh or expanded metal lath whereby the particulate gathers in the interstitial spaces.

Effectiveness is increased still further by placing an agglomeration unit in the exhaust system upstream from the separator. This unit comprises a chamber with an exhaust inlet and outlet and is filled with a pervious mass of metal bodies such as wire mesh or expanded metal lath, or alternatively can be filled with an alumina.

DESCRIPTION OF THE PREFERRED EMBODIMENTS

Figure 1:
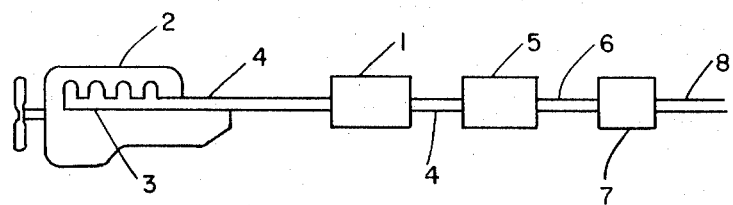
FIG. 1 is a schematic showing an internal combustion engine and its exhaust system, comprising an exhaust pipe, an agglomeration unit, a cyclone type particulate separator and a filter.

Referring to the drawings, FIG. 1 shows an embodiment of the invention in which a muffler containing a non-perforate bottom, side-slotted, cyclone particulate separator is used in an exhaust system for an internal combustion engine. The system comprises the engine 2 having an exhaust manifold 3 which connects with exhaust pipe 4, leading to the inlet port of agglomeration unit 1. From here, exhaust pipe 4 connects to the inlet of muffler 5 which contains a non-perforate bottom, side-slotted, particulate separator. After the particulates are removed in the separator, the cleaned exhaust gas passes through pipe 6 leading to filter unit 7 wherein any residual particulates are removed. The purified gas is then passed to the atmosphere through tail pipe 8.

Figure 2:
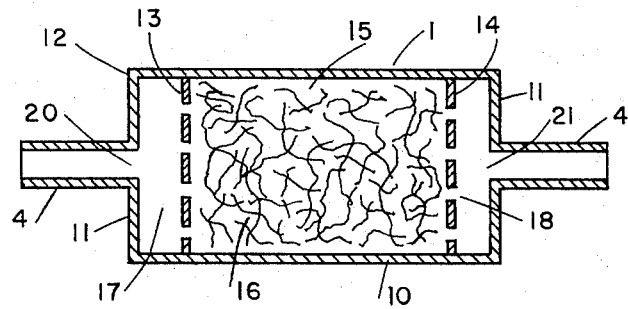
FIG. 2 is a cross-section of the agglomeration unit.

The agglomeration unit 1 is shown in more detail in FIG. 2. Unit 1 is formed by side wall 10 and end closures 11 which form a closed housing 12. Located within housing 12 are perforate retainers 13 and 14 which form chamber 15 containing a pervious mass of metal bodies such as wire mesh 16. Retainer 13 forms an inlet plenum 17 and retainer 14 forms an outlet plenum 18.

Exhaust gas from engine 2 is conducted by exhaust pipe 4 to inlet 20 of unit 1 into inlet plenum 17. From here the exhaust gas passes through perforate retainer 13 into chamber 15 wherein it contacts pervious metal body 16 causing the particulate size in the exhaust gas to increase. The exhaust gas with the enlarged particulate passes through retainer 14 into outlet plenum 18 and leaves unit 1 at outlet 21.

Figure 3:
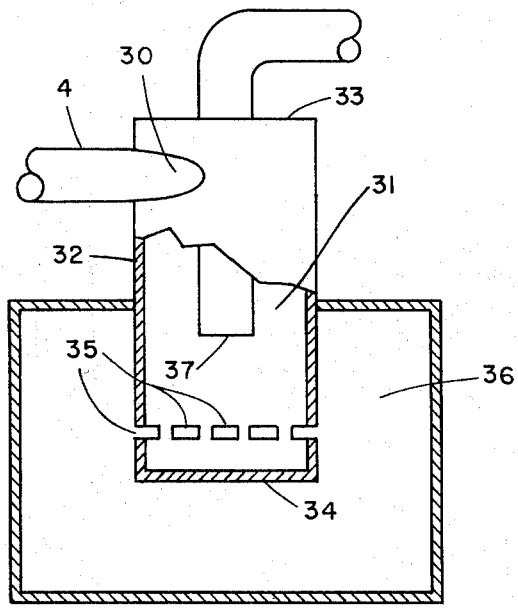
FIG. 3 is a partially cut-away drawing of the cyclone type particulate separator showing a cyclone chamber with an exit tube extending therein and reject slots in the side wall of the cyclone chamber forming a passageway into a collection chamber containing wire mesh.

The exhaust gas leaving agglomeration unit 1 is conducted by exhaust pipe 4 to a non-perforate bottom, side-slotted, cyclone separator. Such a separator is shown in detail in FIG. 3.

The separator comprises tangential entry port 30 located at the top part of cyclone chamber 31, which is defined by a substantially circular side wall 32 and end closures 33 and 34. Closure 34 is a non-perforate plate. The cyclone chamber can employ any of several well-known conventional means for inducing cyclonic circulation such as deflecting vanes or tangential entry. At the end opposite entry port 30, reject slots or holes 35 are cut in side wall 32 through which cyclone chamber 31 communicates with closed collection chamber 36. Extending down the axis of cyclone chamber 31 is exit tube 37, which extends through end closure 33 nearest the entry port. The diameter of housing 32 is greater than the inside diameter of exit tube 37 throughout the length of cyclone chamber 31. Collection chamber 36 can be filled with a porous material. This can be any material which has a solid phase with many interstitial spaces. Examples of these are wire mesh, steel wool, metal turnings, nails, expanded metal, wire screen, glass wool, asbestos fiber, marble chips, granular alumina, granular silica, and the like. Preferred porous materials are expanded metal lath and wire mesh.

The size relationship of the cyclone separator depends upon the gas volume and particulate size and can readily be determined by well-known methods. In removing particulates from the exhaust gas from an automotive engine good results are obtained using a cyclone chamber about 2–3 inches in diameter and 6–12 inches long with an exit tube 1–2 inches in diameter.

In operation, gas containing particulates enters cyclone chamber 31 at entry port 30 and is induced into cyclonic rotation by conventional means. It spirals down cyclone chamber 31 throwing particulate material against side wall 32. When the particulates reach reject slots 35 they are rejected into collection chamber 36. Slots 35 are located proximate to but not abutting closure 34. For example, they may be one-half to one inch above closure 34. Means can be provided for periodically removing collected particulates from collection chamber 36, such as a removable cover. The spiraling gas vortex reaches non-perforate end closure 34 and reverses direction spiraling up and passing into exit tube 37, which conducts the cleaned exhaust gas through end closure 33. There is no obstruction between closure 34 and tube 37 to interfere with this exiting gas. Exit tube 37 can be adapted to engage another conduit to carry the clean gas to a more remote location or to another unit for further treatment such as to a conventional catalytic muffler or to a filtration unit.

Figure 4:
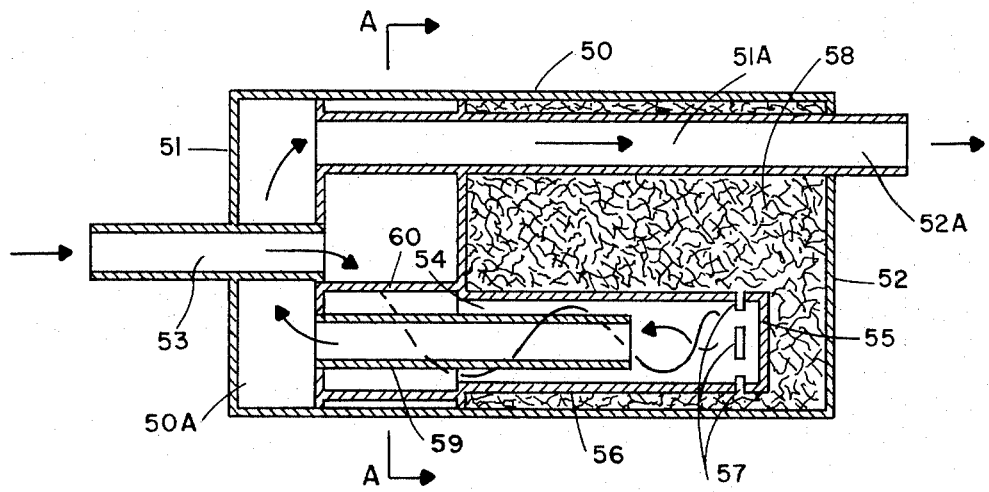
FIG. 4 is a longitudinal cross-section of a muffler containing a non-perforated bottom, side-slotted, cyclone separator. The arrows show the exhaust gas path through the muffler.
Figure 5:
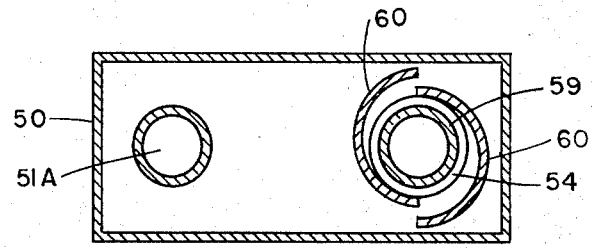
FIG. 5 is a cross-section of the same muffler shown in FIG. 4 taken at AA. It shows spirally positioned deflector vanes which are one means of inducing cyclonic flow.

FIG. 4 shows an embodiment of the particulate removal device in which the cyclone separator is disposed within a muffler suitable for use in an automotive exhaust system. The muffler is defined by side walls 50 and end closures 51 and 52. Inlet 53 forms a flow path through end closure 51 to substantially circular cyclone chamber 54. At the entry end of cyclone chamber 54 are deflector vanes 60 which in effect form two tangential entry ports to chamber 54. At the other end of cyclone chamber 54 is non-perforate bottom plate 55. In side wall 56 of chamber 54 are reject slots 57 cut in the area proximate to but not abutting bottom plate 55. Chamber 54 communicates through reject slots 57 with collection chamber 58 which contains expanded metal lath. Exit tube 59 extends axially into chamber 54 and communicates with compartment 50A, which in turn communicates with exhaust tube 51A to muffler outlet 52A.

In operation, muffler inlet 53 is connected to exhaust pipe 4 downstream from agglomeration unit 1 such that the exhaust pipe carries particulate containing gas from the agglomeration unit to muffler inlet 53. The gas passes through end closure 51 and then past deflector vanes 60 into cyclone chamber 54 in a spiraling motion. Particulates in the gas are thrown against side wall 56 and subsequently rejected through slots 57 into collection chamber 58. The exhaust gas reverses direction on bottom plate 55 and enters exit tube 59. It then passes into compartment 50A and then exhaust tube 51A, which takes it through end closure 52 to muffler outlet 52A. Muffler outlet 52A is adapted to engage a tail pipe or other conduit for conducting the cleaned exhaust gas to a more remote location where it can be exhausted to the atmosphere or treated further, for example, by passing it through a conventional catalytic muffler or through a final filter.

Figure 6:
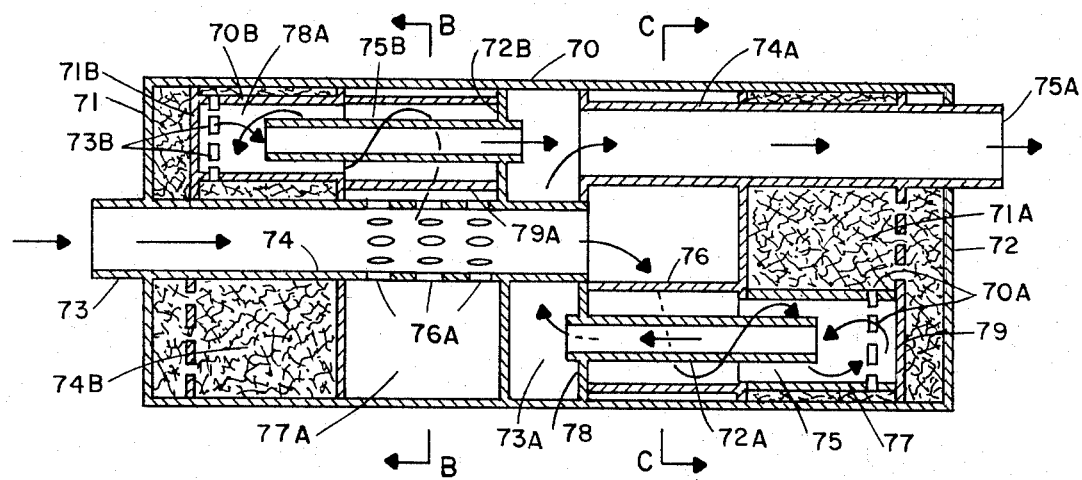
FIG. 6 is a longitudinal cross-section of a muffler containing dual non-perforate bottom, side-slotted, cyclone separators. It shows a perforated primary exhaust conduit. Both primary and secondary exhaust paths are shown by arrows.
Figure 7:
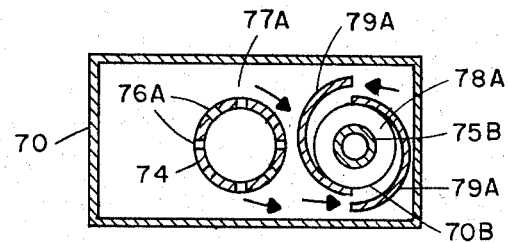
FIG. 7 is a cross-section of the same muffler shown in FIG. 6 taken at BB, showing the perforated primary conduit, the secondary cyclone separator and the flow path from the primary conduit through the perforations to the secondary cyclone.
Figure 8:
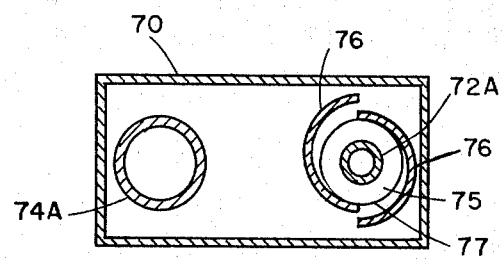
FIG. 8 is a cross-section of the muffler shown in FIG. 7 taken at CC, showing the deflecting vanes of the primary cyclone separator and the exhaust tube leading to the atmosphere.

FIG. 6 shows an embodiment of the invention in which a muffler is constructed to contain dual non-perforate bottom, side-slotted, cyclone separators. This device comprises a muffler body formed by side walls 70 and end closures 71 and 72. Exhaust inlet 73 is adapted to engage exhaust pipe 4 downstream from agglomerator 1. Inlet 73 communicates through primary exhaust conduit 74 with cyclone chamber 75. At the entry end of chamber 75 are deflector vanes 76 which in effect provide two tangential inlets and function to induce cyclonic flow. Chamber 75 is formed by substantially circular side wall 77 and end closures 78 and 79. Reject slots 70A are cut in side wall 77 in the area proximate to but not abutting end closure 79. Chamber 75 communicates through reject slots 70A with collection chamber 71A. Exit tube 72A extends into cyclone chamber 75 and communicates through end closure 78 with plenum chamber 73A, which forms a flow path through exhaust tube 74A to exhaust outlet 75A. Primary conduit 74 contains perforations 76A which communicate with secondary conduit 77A. Secondary conduit 77A forms a flow path into secondary substantially circular cyclone chamber 78A, past deflector vanes 79A. Secondary chamber 78A is formed by side wall 70B and end closures 71B and 72B. Cut in side wall 70B are reject slots 73B, which communicate with collection chamber 74B. Extending into secondary chamber 78A is exit tube 75B forming a passage through end closure 72B to plenum chamber 73A which, as stated previously, communicates through exhaust tube 74A to exhaust outlet 75A.

In operation, exhaust gas containing particulates is conducted from the exhaust manifold of the engine through exhaust pipe 4 to agglomeration unit 1 wherein the particulate size is increased. The exhaust gas leaving unit 1 at outlet 21 is conducted by exhaust pipe 4 to muffler inlet 73. This gas is conducted through primary conduit 74 to cyclone chamber 75. In entering cyclone chamber 75, the exhaust gas is induced into cyclonic flow by detector vanes 76. The particulates are thrown against side wall 77 and, finally, are rejected through reject slots 70A into collection chamber 71A. The exhaust gas reverses direction and spirals up through exit tube 72A into plenum chamber 73A and then passes out through exhaust tube 74A, and finally leaves the muffler at muffler outlet 75A.

A portion of the particulate-laden exhaust gas entering the muffler at inlet 73 and passing through primary conduit 74 escapes conduit 74 through perforations 76A. As the amount of exhaust volume increases, the increased pressure in primary conduit 74 causes an increased amount of the exhaust to pass through perforations 76A into secondary exhaust conduit 77A. This gas then enters secondary cyclone chamber 78A after being induced into cyclonic flow by deflector vanes 79A. The particulates are impinged against substantially circular side wall 70B and finally exit cyclone chamber 78A through reject slot 73B into collection chamber 74B. The cleaned exhaust gas reverses direction at solid end closure 71B and spirals back up through exit tube 75B into plenum chamber 73A. From here, the cleaned exhaust gas together with the cleaned exhaust gas from the primary cyclone separator leaves the muffler through exhaust tube 74A and can be exhausted to the atmosphere or treated further with a catalytic converter and/or a final filter to remove any particulates remaining in the exhaust gas.

As mentioned previously, the cleaned exhaust gas, after passing through the cyclone separator of the present invention, can further be processed using a conventional catalytic muffler. In such mufflers a catalyst bed is provided and the exhaust gas passes through a catalyst bed wherein the unburned carbon monoxide and hydrocarbon substituents of the exhaust gas are oxidized. Frequently, supplemental air is mixed with the exhaust gas prior to passing through the catalytic muffler. This can be accomplished with an air pump or a venturi device. Sometimes the supplemental air is added in the exhaust manifold in order to take advantage of the extremely high temperatures therein and effect further oxidation of the gas. Suitable catalysts for use in the catalytic muffler include metallic elements, their salts and oxides, such as copper, iron, manganese, nickel, platinum, palladium, vanadium, chromium, and the like. The catalytic metals, oxides or salts are generally impregnated on a carrier material such as alumina, silica, silica-alumina, kaolin, and the like. Some especially preferred catalysts are alumina impregnated with copper oxide and palladium, alumina impregnated with copper dioxide, chromia and vanadia, and alumina impregnated with copper oxide, chromia and palladium.

In another embodiment, the pervious mass of metal bodies 16 in chamber 15 of agglomeration unit 1 are replaced with an alumina. This embodiment functions in a different manner than the metal bodies. The high surface to volume ratio metal bodies appear to function solely by impingement to achieve particulate growth. In the alumina embodiment, uncondensed compounds capable of forming fine particulates such as lead halides are absorbed, thus preventing the formation of fine particulates as described by Tulleners et al., U.S. Pat. No. 3,397,034. Any degradation of the alumina absorbent resulting in release of alumina particulates does not result in any increase in exhaust particulates because this coarse material is efficiently trapped downstream by the non-perforate bottom, side-slotted, cyclone trap, or muffler containing such trap.

Figure 9:
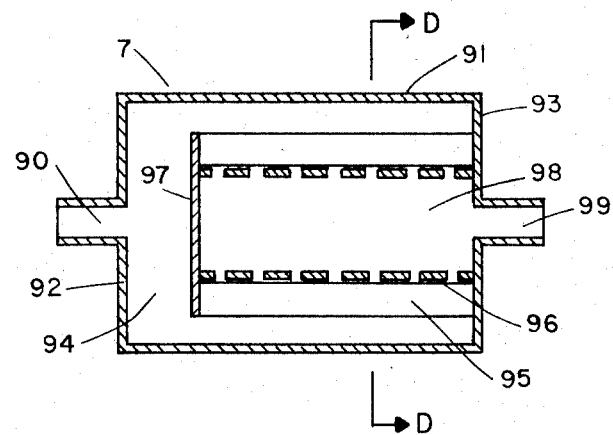
FIG. 9 is a longitudinal cross-section of an exhaust gas final filter.
Figure 10:
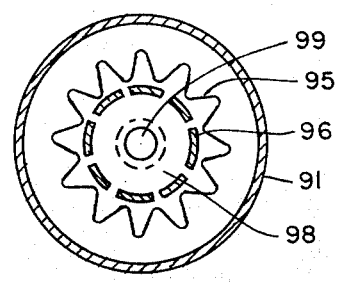
FIG. 10 is a cross-section of the filter taken at DD.

Practically complete removal of particulates in the exhaust gas can be achieved by inclusion of an exhaust filter 7 in the exhaust system downstream from the cyclone separator. A suitable filter unit is shown in FIGS. 9 and 10. Pipe 6 conducts exhaust gas to inlet 90 of filter unit 7 formed by side wall 91 and end closures 92 and 93. The exhaust gas passes into chamber 94. Pleated filter element 95 is positioned around cylindrical perforate tube 96. The filter element should be constructed of heat-resistant material which can suitably be made of woven or random fiberglass mat. Tube 96 is attached to end closure 93. At the opposite end of tube 96 is non-perforate disk 97 which prevents entry of exhaust gas into the interior 98 of tube 96, forcing it to pass through filter element 95. Disk 97 has about the same diameter as the outside diameter of pleated filter element 95 and thus also serves to prevent exhaust gas from entering the open end of the pleated filter.

In operation, exhaust gas from the non-perforate bottom, side-slotted, cyclone separator contained in muffler 5 is conducted by pipe 6 through inlet 90 to chamber 94. From here the exhaust gas is forced through filter 95 whereby residual particulates are removed. The cleaned exhaust gas then passes through perforate tube 96 to the interior 98 of tube 96. From here it exits the filtration unit through outlet 99 and is exhausted to the atmosphere.

It has been found that the agglomeration unit and the cyclone type inertial separators described herein have much higher efficiencies in removing finely-divided particulates from exhaust gas than similar devices known in the prior art. The foregoing constitutes a full disclosure of the features of the present invention and the manner in which it is used. It should be understood that variations of this invention which accomplish the same result with equivalent means are also embodied within the scope of the following claims.

I claim:

1. An exhaust system for an internal combustion engine, said system comprising
   A. an exhaust pipe, and
   B. a cyclone-type particulate separator comprising a cyclone housing formed by a side wall and end closures, said housing having an entry port at one end, means for inducing cyclonic circulation of particulate-containing gas entering said cyclone housing through said entry port, and exit tube axially located within said cyclone housing and extending through the end closure nearest said entry port, the opposite end closure being non-perforate, said housing having a substantially circular cross-section having throughout its length an inside diameter greater than the inside diameter of said exit tube, an opening in said side wall in proximity to said non-perforate end closure, said opening connecting with a closed particulate collection chamber, and having an unobstructed axial flow path from said non-perforate end closure to said exit tube, said exhaust pipe being operatively connected to said engine and to said cyclone separator entry port to form an exhaust flow path from said internal combustion engine to said cyclone separator, and including in said exhaust flow path from said internal combustion engine to said cyclone separator entry port
   C. an agglomeration unit, said agglomeration unit comprising side walls and end closures forming an agglomeration housing having an exhaust gas entry port connected by said exhaust pipe to said internal combustion engine and an exhaust gas exit port connected by said exhaust pipe to said entry port of said separator, said agglomeration housing containing a pervious mass of metallic bodies having a high surface area to volume ratio, said pervious mass being disposed within said agglomeration housing and across said housing such that the engine exhaust gas passes through said pervious mass while moving from said entry port to said exit port of said agglomeration unit.

2. An exhaust system of claim 1 wherein said pervious mass of metal bodies is wire mesh.

3. An exhaust system of claim 1 wherein said pervious mass of metal bodies is expanded metal lath.

4. An exhaust system of claim 1 wherein said particulate collection chamber contains expanded metal lath.

5. An exhaust system of claim 4 wherein said pervious mass of metal bodies is expanded metal lath.

6. An exhaust system for an internal combustion engine, said system comprising
   A. an exhaust pipe,
   B. a muffler comprising a muffler body having a muffler inlet operatively connected to said exhaust pipe and a muffler outlet,
   C. a cyclone separator positioned within said muffler body,
   D. means for conducting exhaust gas within said muffler from said muffler inlet into said cyclone separator, and
   E. means for conducting purified exhaust gas within said muffler from said cyclone separator out through said muffler outlet,
said cyclone separator comprising a cyclone having formed by a side wall and end closures, said housing having an entry port at one end, means for inducing cyclonic circulation of particulate-containing gas entering said cyclone housing through said entry port, an exit tube axially located within said cyclone housing and extending through the end closure nearest said entry port, the opposite end closure being non-perforate, said housing having a substantially circular cross-section having throughout its length an inside diameter greater than the inside diameter of said exit tube, an opening in said side wall in proximity to said non-perforate end closure, said opening connecting with a closed particulate collection chamber, and having an unobstructed axial flow path from said non-perforate end closure to said exit tube, said exhaust pipe being operatively connected to said engine to form an exhaust flow path from said engine to said muffler, and including in said exhaust flow path from said engine to said muffler
   F. an agglomeration unit, said agglomeration unit comprising side walls and end closures forming an agglomeration housing having an exhaust gas entry port connected by said exhaust pipe to said engine and an exhaust gas exit port connected by said exhaust pipe to said muffler inlet, said agglomeration housing containing a pervious mass of metallic bodies having a high surface area to volume ratio, said pervious mass being disposed within said agglomeration housing and across said housing such that the exhaust gas passes through said pervious mass while moving from said entry port to said exit port of said agglomeration unit.

7. An exhaust system of claim 6 wherein said pervious mass of metallic bodies is wire mesh.

8. An exhaust system of claim 6 wherein said pervious mass of metal bodies is expanded metal lath.

9. An exhaust system of claim 8 wherein said particulate collection chamber contains expanded metal lath.

10. An exhaust system of claim 9 including a filtration unit in the exhaust flow path downstream from said muffler, said filtration unit comprising a housing formed by side walls and end closures having a filter inlet and outlet and a filter element disposed within said housing in a manner such that said exhaust gas passes through said filter element in passing from said filter inlet to said filter outlet.

11. An exhaust system for an internal combustion engine, said system comprising
   A. an exhaust pipe,
   B. a muffler comprising a muffler body having a muffler inlet operatively connected to said exhaust pipe and a muffler outlet,
   C. a cyclone separator positioned within said muffler body,
   D. means for conducting exhaust gas within said muffler from said muffler inlet into said cyclone separator, and
   E. means for conducting purified exhaust gas within said muffler from said cyclone separator out through said muffler outlet,
said cyclone separator comprising a cyclone housing formed by a side wall and end closures, said housing having an entry port at one end, means for inducing cyclonic circulation of particulate-containing gas entering said cyclone housing through said entry port, an exit tube axially located within said cyclone housing and extending through the end closure nearest said entry port, the opposite end closure being non-perforate, said housing having a substantially circular cross-section having throughout its length an inside diameter greater than the inside diameter of said exit tube, an opening in said side wall in proximity to said non-perforate end closure, said opening connecting with a closed particulate collection chamber, and having an unobstructed axial flow path from said non-perforate end closure to said exit tube, said exhaust pipe being operatively connected to said engine to form an exhaust flow path from said engine to said muffler, and including in said exhaust flow path from said engine to said muffler
   F. an agglomeration unit, said agglomeration unit comprising side walls and end closures forming an agglomeration housing having an exhaust gas entry port connected by said exhaust pipe to said engine and an exhaust gas exit port connected by said exhaust pipe to said muffler inlet, said agglomeration housing containing an alumina, said alumina being disposed within said agglomeration housing and across said housing such that the engine exhaust gas passes through said alumina while moving from said entry port to said exit port of said agglomeration unit.

* * * * *

PO-1050
(5/69)

UNITED STATES PATENT OFFICE
CERTIFICATE OF CORRECTION

Patent No. 3,815,337  Dated June 11, 1974

Inventor(s) Denis L. Lenane

It is certified that error appears in the above-identified patent and that said Letters Patent are hereby corrected as shown below:

Column 7, in Claim 6, at line 25, "having" should read -- housing -- .

Signed and sealed this 17th day of September 1974.

(SEAL)
Attest:

McCOY M. GIBSON JR.
Attesting Officer

C. MARSHALL DANN
Commissioner of Patents